US008382351B2

(12) United States Patent
Ishikawa et al.

(10) Patent No.: US 8,382,351 B2

(45) Date of Patent: Feb. 26, 2013

(54) VEHICLE LAMP

(75) Inventors: Tomomi Ishikawa, Shizuoka (JP); Shigehiko Kazaoka, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 85 days.

(21) Appl. No.: 13/004,073

(22) Filed: Jan. 11, 2011

(65) Prior Publication Data

US 2011/0170307 A1 Jul. 14, 2011

(30) Foreign Application Priority Data

Jan. 14, 2010 (JP) ................................ 2010-005552
Nov. 25, 2010 (JP) ................................ 2010-262664

(51) Int. Cl.
*F21V 7/00* (2006.01)

(52) U.S. Cl. .................. 362/517; 362/249.02; 362/509; 362/511; 362/545

(58) Field of Classification Search .................. 362/234, 362/249.01–249.02, 253, 509, 511, 516–517, 362/520, 543–545
See application file for complete search history.

(56) References Cited

U.S. PATENT DOCUMENTS

| | | | | |
|---|---|---|---|---|
| 5,497,306 | A | 3/1996 | Pastrick | |
| 2004/0257790 | A1 * | 12/2004 | Tanaka et al. | 362/23 |
| 2008/0259620 | A1 | 10/2008 | Oba et al. | |

FOREIGN PATENT DOCUMENTS

| | | | |
|---|---|---|---|
| DE | 102007019688 | A1 | 10/2008 |
| EP | 1726480 | A2 | 11/2006 |
| EP | 1970736 | A1 | 9/2008 |
| JP | 2004001710 | A | 1/2004 |
| JP | 2006164908 | A | 6/2006 |

OTHER PUBLICATIONS

European Search Report issued in European Patent Application No. 11150191.2 on Apr. 1, 2011.

* cited by examiner

*Primary Examiner* — Meghan Dunwiddie
(74) *Attorney, Agent, or Firm* — Sughrue Mion, PLLC

(57) ABSTRACT

In a vehicle lamp (1), a plurality of LED light sources (11) are arranged on a common substrate (12). A light guiding lens (13) elongated in a direction in which the LED light sources (11) are aligned is provided. A plurality of reflecting sections (22) are provided on the light guiding lens (13). The reflecting sections (22) are configured to individually reflect incident lights from the respective LED light sources (11) to a periphery of a vehicle. Respective directions of the reflecting sections (22) are made to differ in accordance with positions of the corresponding LED light sources (11).

12 Claims, 10 Drawing Sheets

VEHICLE LAMP

BACKGROUND OF THE INVENTION

1. Field of the Invention

The present invention relates to a vehicle lamp which illuminates a predetermined range on a periphery of a vehicle with light from a plurality of LED light sources.

2. Related Art

FIG. 11 shows a side turn signal lamp 51 which relates to the invention. The lamp 51 is provided with a lamp body 53 installed within a housing 52 of a door mirror (which is an outside rearview mirror on a front side door) and an outer cover 54. A plurality of LED light sources 56 and a plurality of substrates 57 of the same number with the light sources are disposed within a lamp chamber 55 defined by the lamp body 53 and the outer cover 54. The substrates 57 are held in different orientations by holders 58, so that a wide range including the front, side and rear of the vehicle is illuminated with light from the plurality of light sources 56.

JP-A-2006-164908 discloses a vehicle lamp which includes an inner lens for covering a front surface portion of an outer lens from an inside thereof, a LED light source which emit light to the inner lens so as to be emitted from a surface of the inner lens, and another LED light source which emits light directly to a side surface portion of the outer lens from the inside thereof, and the plurality of LED light sources are mounted on separate substrates. JP-A-2004-001710 discloses a vehicle lamp in which a plurality of LED light sources are arranged on a common substrate and which irradiate light from the respective light sources in the same direction on to the periphery of a vehicle.

However, according to the vehicle lamp shown in FIG. 11 or in JP-A-2006-164908, the same number of substrates as the number of light sources are needed to change the orientations of the LED light sources, which increases the number of components, leading to a problem that the fabrication costs are increased. In addition, since the LED light sources are arranged in a horizontal direction, a depth of the lamp is increased, and there is caused a drawback that point light emissions from the respective LED light sources tends to become visible from the outside of the vehicle lamp. In the vehicle lamp of JP-A-2004-001710, although the substrate can be commonized, since the plurality of light sources are both oriented to the front of the vehicle, there is caused a problem that the side and rear of the vehicle become relatively dark.

SUMMARY OF THE INVENTION

One or more embodiments of the invention provide a vehicle lamp which can illuminate brightly a wide range around a periphery of a vehicle with an inexpensive configuration.

In accordance with the embodiments of the invention, a vehicle lamp 1 is provided with: a common substrate 12; a plurality of LED light sources 11 arranged on the common substrate 12; a light guiding lens 13 elongated in a direction in which the LED light sources 11 are aligned; and a plurality of reflecting sections 22 provided on the light guiding lens 13 and configured to individually reflect incident lights from the respective LED light sources 11 to a periphery of a vehicle. Respective directions of the reflecting sections 22 are made to differ in accordance with positions of the corresponding LED light sources 11.

DETAILED DESCRIPTION OF THE EXEMPLARY EMBODIMENTS

Figure 1:
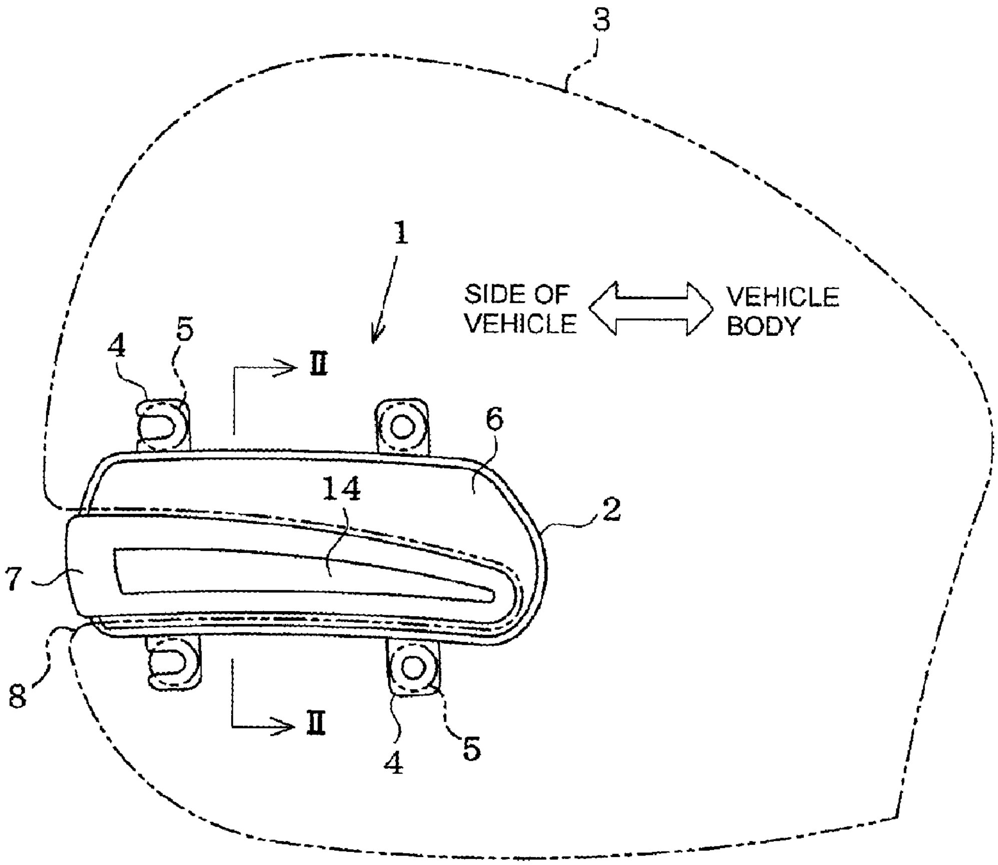
FIG. 1 is a front view of a side turn signal lamp according to an exemplary embodiment of the invention.

An exemplary embodiment of the invention will be described based on the accompanying drawings. In the exemplary embodiment, a vehicle lamp of the invention is embodied into a side turn signal lamp of a motor vehicle. As shown in FIG. 1, a body 2 of the side turn signal lamp 1 is placed in an interior of a mirror housing 3 and is fixed in place by mounting pieces 4 by employing screws. An outer cover 6 is placed on a front side of the lamp body 2 and is held on the mirror housing 3 via a retainer (whose illustration is omitted). An exposing portion 7 having a laterally elongated protuberant shape is formed on the outer cover 6 so as to be exposed from an opening portion 8 in the mirror housing 3.

Figure 2:
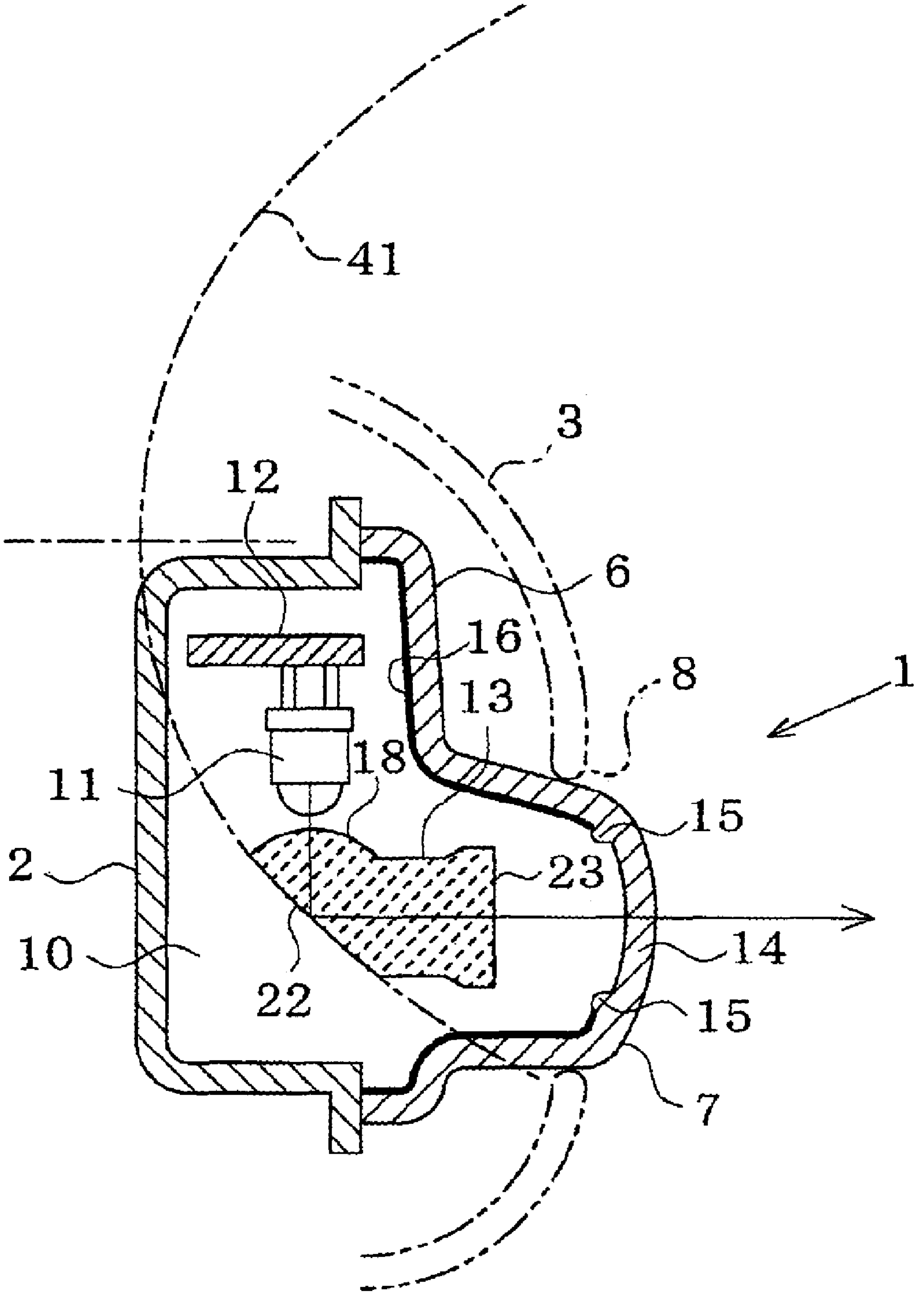
FIG. 2 is a sectional view taken along the line II-II in FIG. 1 and showing an interior of the lamp.

As shown in FIG. 2, LED light sources 11, a substrate 12 and a light guiding lens 13 are disposed within a lamp chamber defined between the lamp body 2 and the outer cover 6. The LED light sources 11 are mounted on the substrate 12 so as to be oriented downwards. The light guiding lens 13 guides light from the LED light sources 11 to the exposing portion 7. A light transmission portion 14 is defined into a laterally elongated slit-like shape (refer to FIG. 1) by two upper and lower cut lines 15 on the exposing portion 7. Light cutting off portions 16 each made up of an aluminum-deposited film are provided on portions on an inner surface of the outer cover 6 which exclude the light transmission portion 104 so as to cut off light emitted directly from the LED light sources 11.

Figure 3:
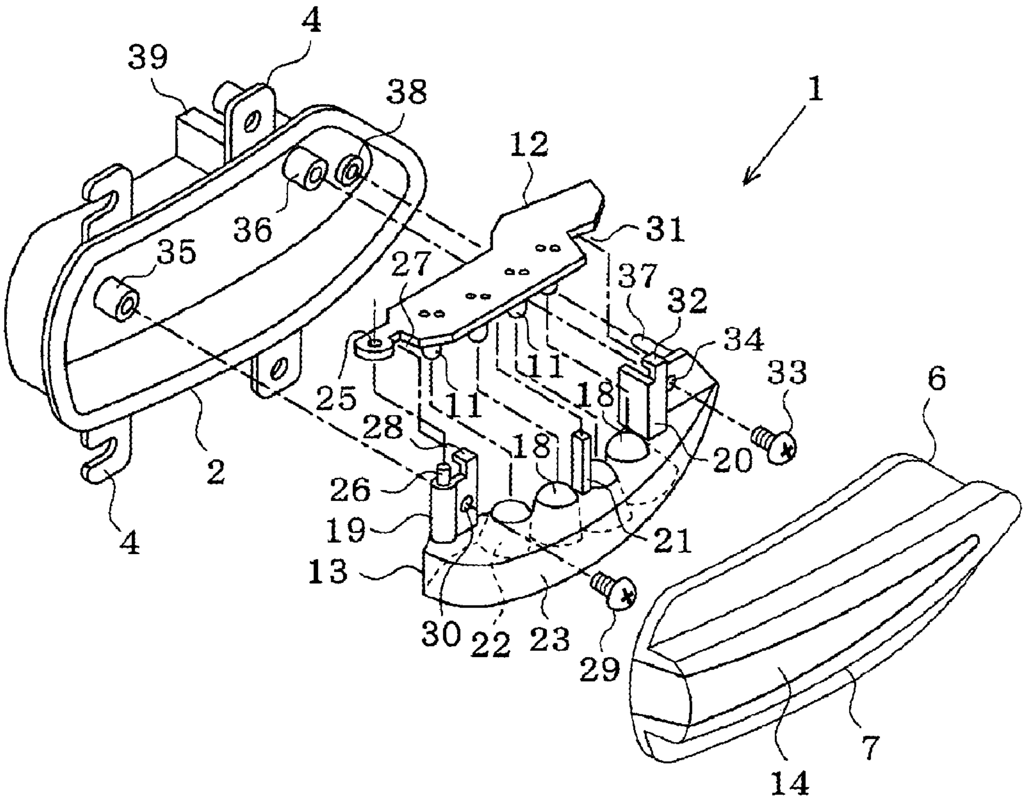
FIG. 3 is an exploded perspective view showing constituent components of the lamp.
Figure 4:
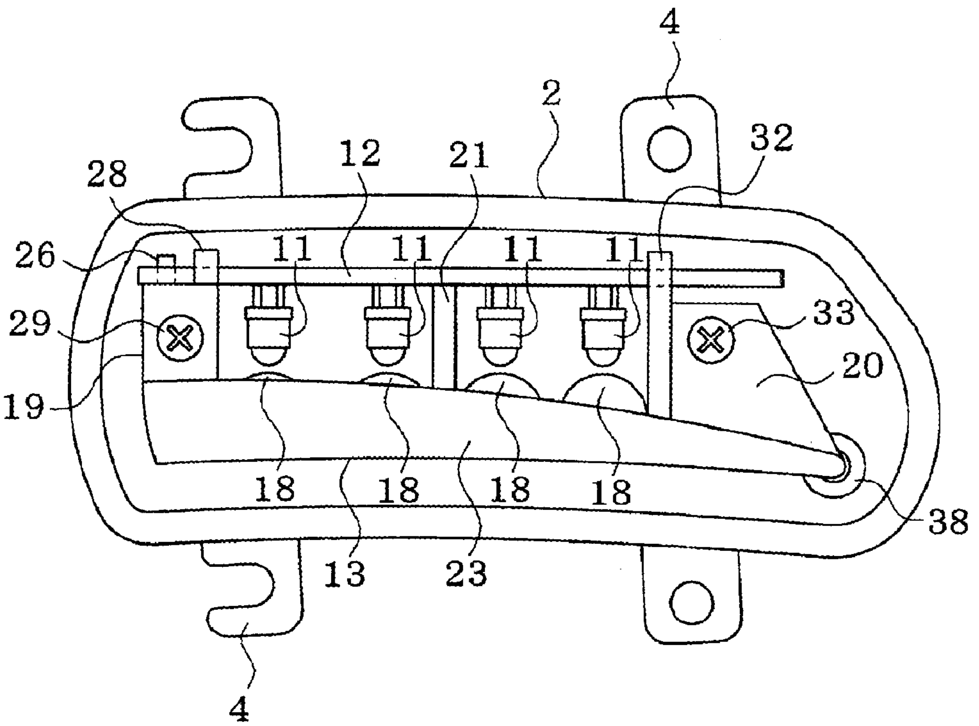
FIG. 4 is a front view showing the interior of the lamp where an outer cover is removed.
Figure 6:
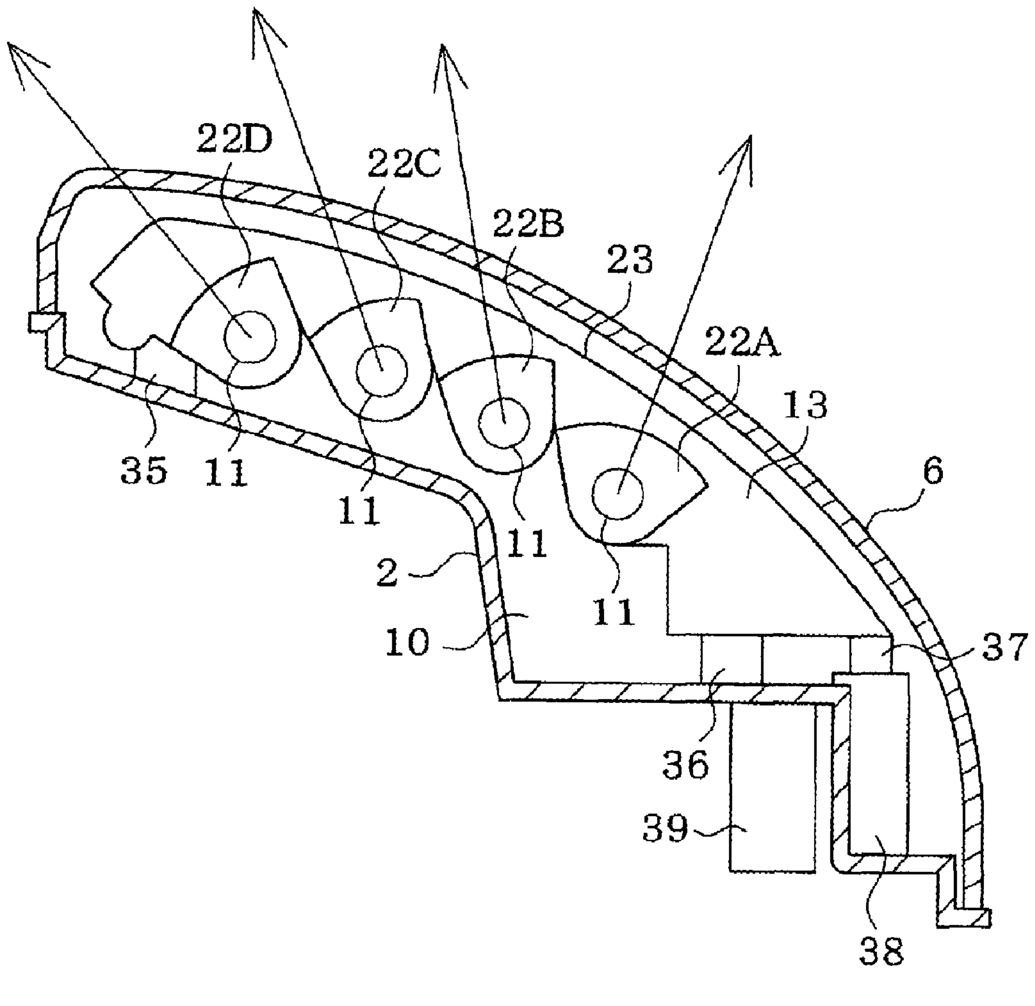
FIG. 6 is a sectional view of the lamp seen from a bottom of the light guiding lens

As shown in FIGS. 3, 4, for example, four LED light sources 11 are arranged on the substrate 12 with their optical axes oriented vertically. The light guiding lens 13 is formed of a transparent resin into a crescent shape which is elongated in a direction in which the light sources 11 are arranged. Four incident portions 18 made up of four convex lenses on which light from the light sources 11 is incident individually and three mounting pieces 19, 20, 21 are provided on an upper surface of the light guiding lens 13. As shown in FIG. 6, four reflecting surfaces (reflecting sections) 22 which totally reflect light incident thereon in a horizontal direction are formed on a lower surface of the light guiding lens 13. A light emitting surface 23 is provided on a front surface of the light guiding lens 13 so that reflected light is emitted therefrom towards the light transmission portion 14.

Figure 5:
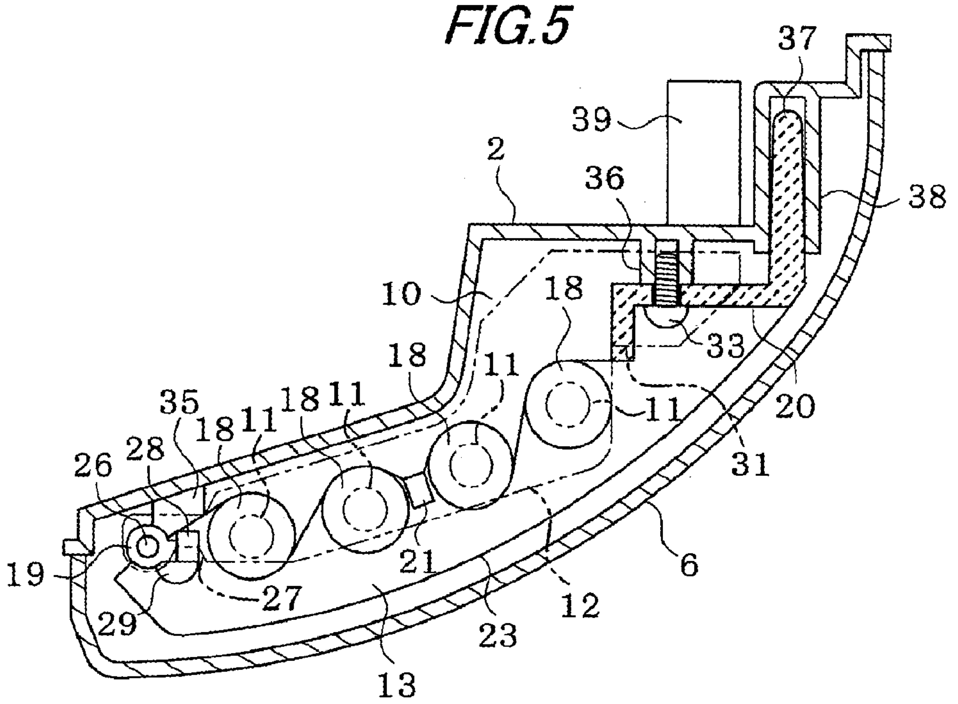
FIG. 5 is a sectional view of the lamp seen from a top of a light guiding lens.

As shown in FIGS. 3, 5, a hook pin 26 which is inserted into a small hole 25 in the substrate 12, a hook claw 28 which is hooked in a notch 27 in the substrate 12, and a mounting hole 30 through which a screw 29 is passed are provided on the mounting piece 19 which is erected at one end of the light guiding lens 13. A hook claw 32 which is hooked in a corner portion 31 of the substrate 12 and a mounting hole 34 through which a screw 33 is passed are provided on the mounting piece 20 which is erected at the other end of the light guiding lens 13. The mounting piece 21 erected at an intermediate portion of the light guiding lens 13 is brought into abutment with a lower surface of the substrate 12 so as to hold a constant space between the LED light sources 11 and the incident portions 18.

The substrate 12 is assembled to the light guiding lens 13 by the hook pin 26 and the hook claws 28, 32, and the light guiding lens 13 is mounted on the lamp body 2 with the screws 29, 33. A pair of boss portions 35, 36 are provided on the lamp body 2 into which the screws 29, 33 are tightened, respectively. A cylindrical portion 38 is formed in proximity to the boss portion 36, into which a positioning pin 37 of the light guiding lens 13 is inserted. A terminal portion 39 is provided in proximity to the cylindrical portion 38, and a terminal pin (whose illustration is omitted) of the substrate 12 is connected to an electric wiring in an interior of a door mirror (which is an outside rearview mirror on the front side door) inside the terminal portion 39.

As shown in FIG. 2, the same number of reflecting surfaces 22 as the number of light sources 11 are formed on the light guiding lens 13 as total reflection steps which include part of a paraboloidal surface 41 with its axis laid horizontal. As shown in FIG. 6, the four total reflection steps 22A, 22B, 22C, 22D are formed on the lower surface of the light guiding lens 13 in positions which correspond to the light sources 11 so as to totally reflect incident light from the respective light sources 11 individually to the periphery of the door mirror. Orientations of the steps 22A to 22D differ in accordance with the positions of the light sources 11. The step 22A which is laid closest to the vehicle body is oriented frontmost, whereas the step 22D which is laid farthest from the vehicle body is oriented rearmost.

Consequently, according to the side turn signal lamp 1, the following functions and advantages can be exhibited.

Figure 7A:
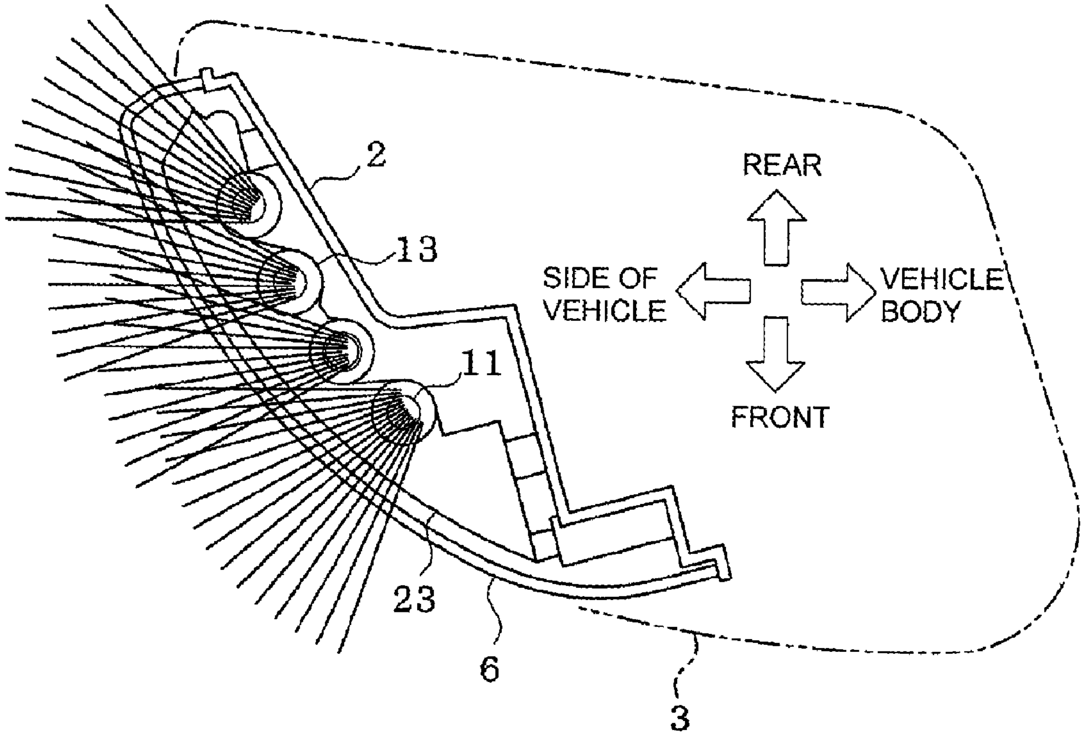
FIG. 7A is a schematic view showing a light distributing operation of the lamp on a horizontal plane.

(a) As shown in FIG. 7A, light from the plurality of LED light sources 11 is emitted in different directions from the light emitting surface 23 of the light guiding lens 13, thereby making it possible to illuminate a wide range on the periphery of the door mirror including the front, side and rear of the vehicle.

(b) Since the light emitting directions are determined depending upon the orientations of the reflecting surfaces 22, the plurality of LED light sources 11 can be arranged on the single substrate 12, thereby making it possible to reduce the number of components of the lamp 1.

(c) Since the orientations of the plurality of reflecting surfaces 22 can be designed individually, even in the event that the external shape of the mirror housing 3 or the positions of the LED light sources 11 change, the light distribution pattern on the periphery of the door mirror can easily be changed.

(d) Since the reflecting surfaces 22 are made to be oriented further rearwards of the vehicle as they are spaced farther apart from the vehicle body, the functional light distribution as the turn signal lamp can be satisfied without increasing the number of LED light sources.

Figure 7B:
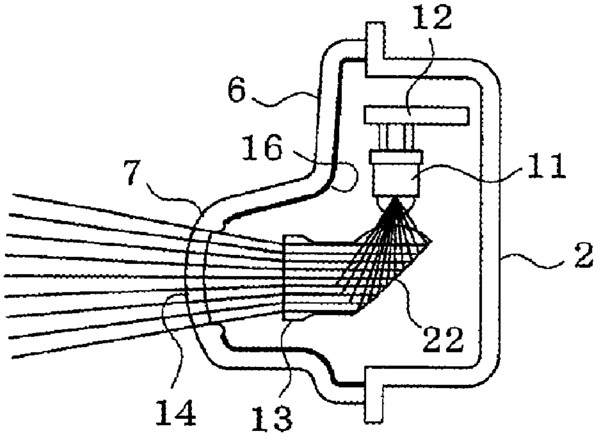
FIG. 7B is a schematic view showing a light distributing operation of the lamp on a vertical plane.

(e) As shown in FIG. 7B, since the LED light sources 1 are provided vertical so as to reflect incident light in the horizontal direction, the depth of the lamp body 2 is made shallow, thereby making it possible to reduce the space where to install the lamp 1 which occupies the interior space of the mirror housing 3.

(f) Since light directly emitted from the LED light sources is cut off by the cutting off portion 16 on the outer cover 6, any point light emission can be eliminated from the light transmission portion 14, thereby making it possible to improve the external appearance of the exposing portion 7.

Figure 11:
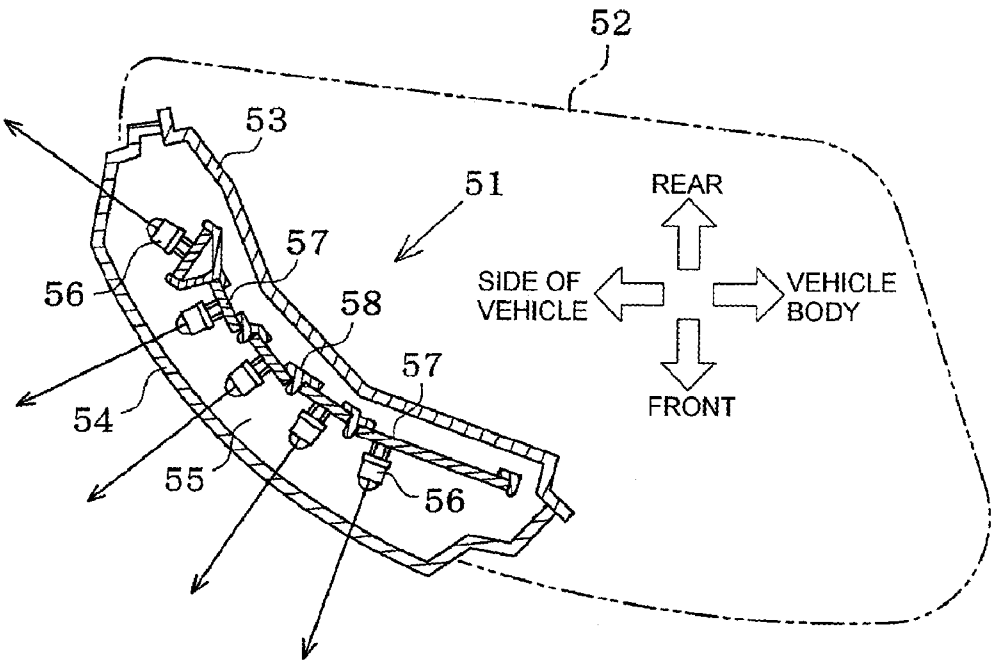
FIG. 11 is a sectional view showing a related side turn signal lamp.

Since the substrate 12 is hooked on the light guiding lens 13 and the light guiding lens 13 is mounted in the mirror housing 3, the necessity of exclusive components (conventional holders 58: refer to FIG. 11) for holding the substrate 12 can be obviated. On top of that, the accuracy of relative position between the LED light sources 11 and the reflecting surfaces 22 can be improved.

Figure 8:
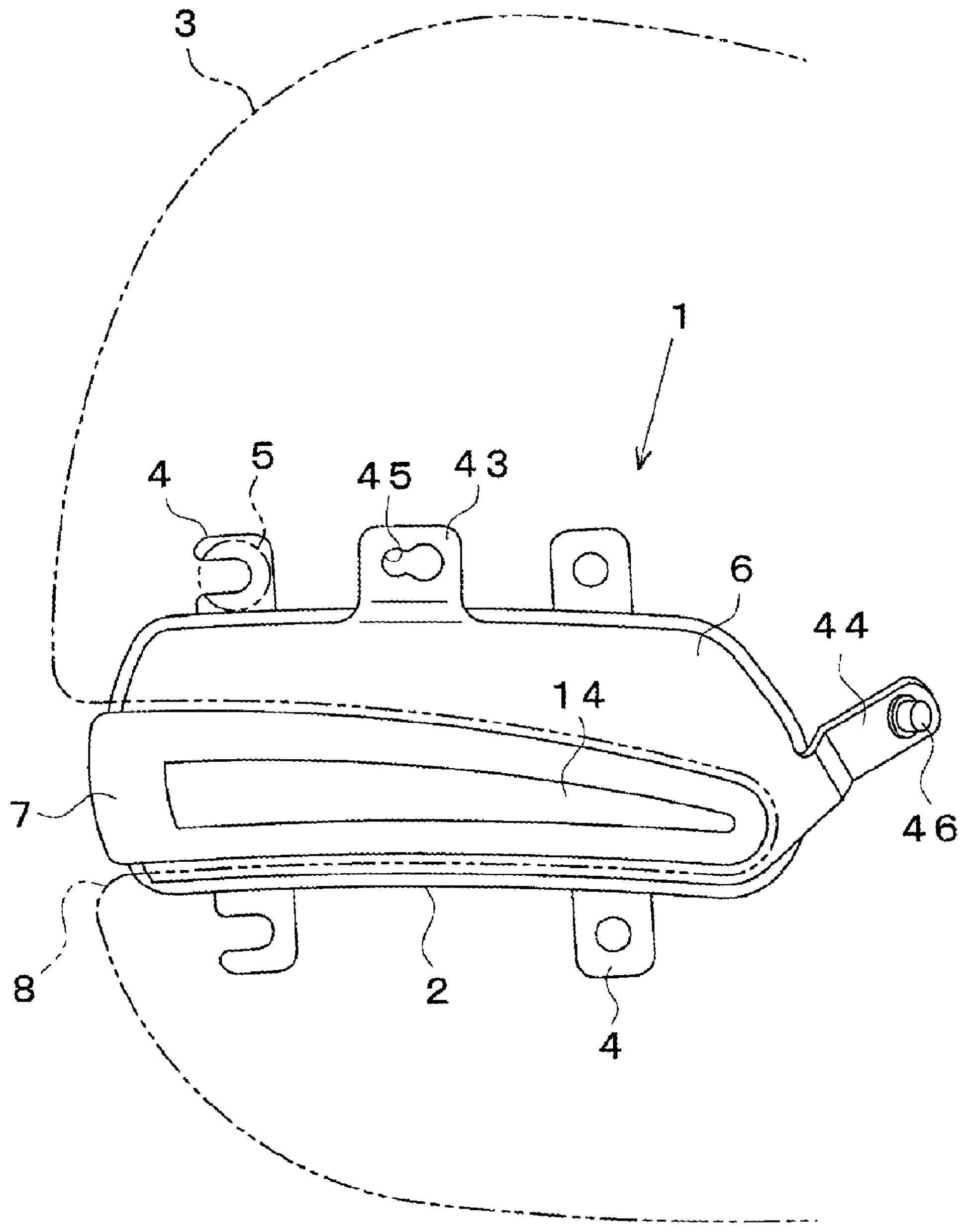
FIG. 8 is a front view showing an example of a positioning structure of the outer cover to a housing.
Figure 9:
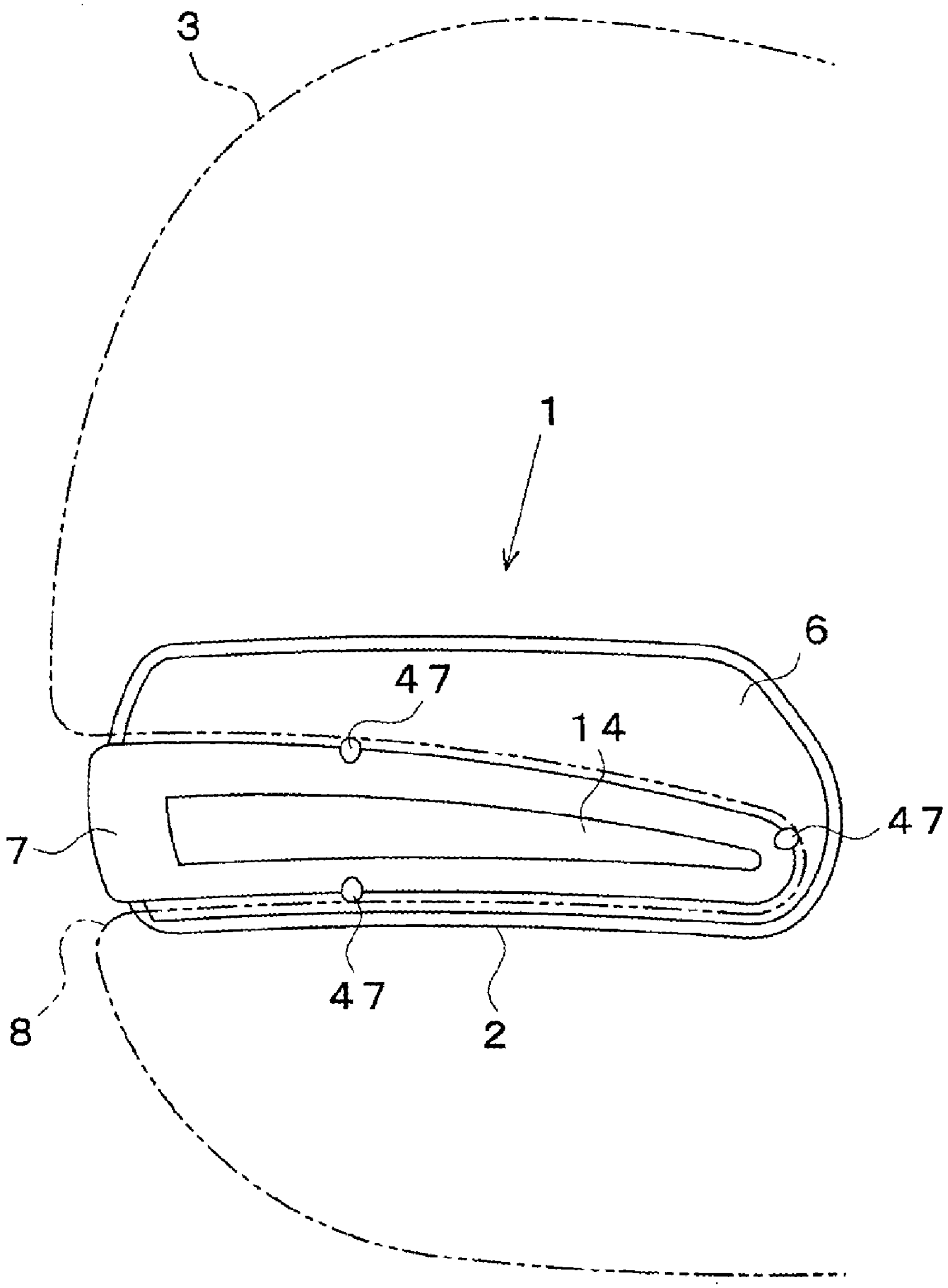
FIG. 9 is a front view showing another example of the positioning structure of the outer cover to the housing.
Figure 10:
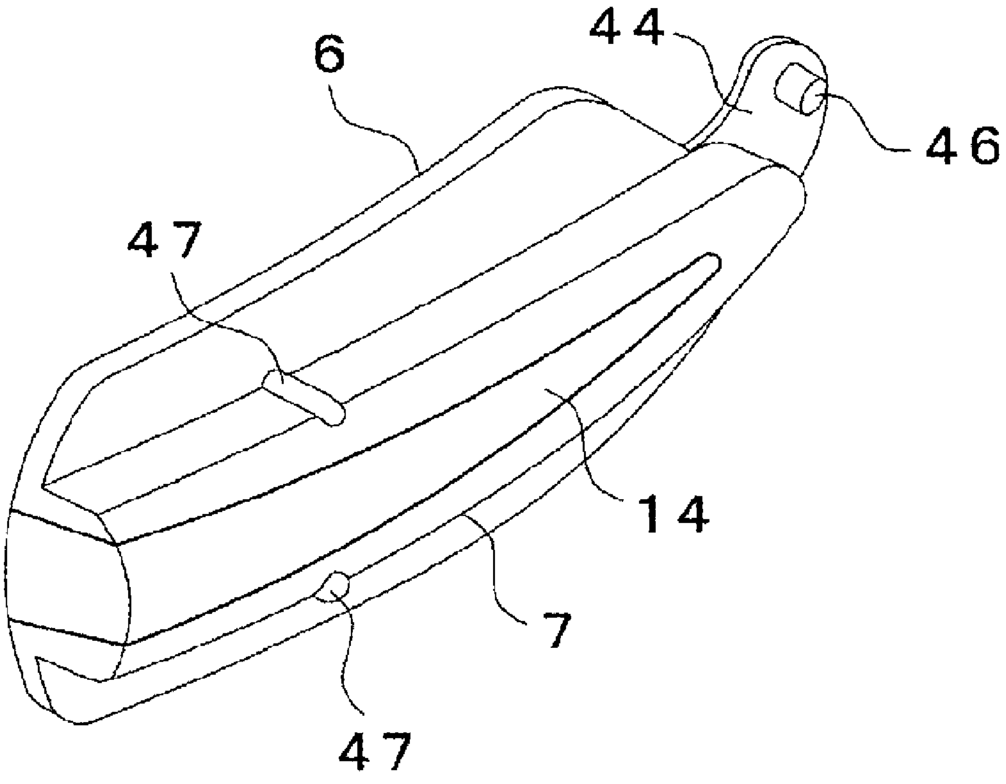
FIG. 10 is a front view showing yet another example of the positioning structure of the outer cover to the housing.

FIGS. 8 to 10 show examples of configurations for positioning the outer cover 6 to the mirror housing 3. The outer cover 6 of the each example of FIGS. 8 to 10 includes a positioning structure (45, 46, 47) to be directly positioned with respect to the mirror housing 3. By these examples, an assembling accuracy of the exposing portion 7 with respect to the opening portion 8 of the mirror housing 3 is improved.

In the example shown in FIG. 8, tabs 43, 44 are provided on an outer peripheral edge of the outer cover 6. In the tab 43, a positioning hole 45 into which a pin (not shown) on the mirror housing 3 is inserted is formed. In the tab 44, a positioning pin 46 inserted into a hole (not shown) on the mirror housing 3 is provided. Thus, even if a positioning of the lamp body 2 is misaligned due to a play between the mounting piece 4 and a screw 5, the outer cover 6 can be accurately positioned with respect to the mirror housing 3. As the positioning structure, a dowel or a rib may be used instead of the hole 45 or the pin 46.

In the example of FIG. 9, three positioning dowels 47 are arranged on a peripheral surface of the exposing portion 7 of the outer cover 6 at arbitrary intervals. The dowels 47 are to be in contact with a peripheral edge of the opening portion 8 of the mirror housing 3 so as to maintain a gap between the opening portion 8 and the exposing portion 7 to be constant. Thus, an outer appearance of the exposing portion 7 having a directivity can be improved. Moreover, the gap between the opening portion 8 and the exposing portion 7 can be narrowed so that an entering of an air into an inside of the housing 3 can be blocked and a generation of a wind roar can be prevented in advance.

In the example of FIG. 10, a tab 44 is provided on an outer peripheral edge of the outer cover 6. A positioning pin 46 is provided on the tab 44. Two positioning dowel 47 are formed on a peripheral surface of the exposing portion 7. Thus, the outer cover 6 can be assembled to the mirror housing 3 in a high accuracy, so that an appearance of the exposing portion 7 can be improved and a wind roar can be prevented. In addition, the outer cover 6 is positioned using by shaped portions 46, 47 formed in the outer cover 6 itself. As a result, it is possible to reduce additional parts such as a protector and a retainer and/or to eliminate screwing steps of the lamp body 2, so that an assembling structure can be simplified.

The invention is not limited to the side turn signal lamp, but the invention can be applied to lamps at various portions of the vehicle such as a high-mount signal lamp, a daytime running lamp, and a rear combination lap. In addition, the invention can be carried out by changing the number of LED light sources 11 and the configuration of the light guiding lens 13 as required without departing from the spirit and scope of the invention.

In accordance with the embodiments, a vehicle lamp 1 is provided with: a common substrate 12; a plurality of LED light sources 11 arranged on the common substrate 12; a light guiding lens 13 elongated in a direction in which the LED light sources 11 are aligned; and a plurality of reflecting sections 22 provided on the light guiding lens 13 and configured to individually reflect incident lights from the respective LED light sources 11 to a periphery of a vehicle. Respective directions of the reflecting sections 22 are made to differ in accordance with positions of the corresponding LED light sources 11.

Each of the LED light sources 11 may have an optical axis extending in a substantially vertical direction. Each of the reflecting sections 22 totally reflects incident light from a corresponding one of the LED light sources 11 in a substantially horizontal direction.

The light guiding lens 13 may include: amounting portion 19, 20 by which the light guiding lens 13 is attached to a housing 3 of a door mirror; and a hook portion 28, 32 by which the substrate 12 is attached to the light guiding lens 13.

The plurality of reflecting sections 22 may be formed so as to direct further rearwards of the vehicle as the plurality of reflecting sections 22 are spaced apart from a vehicle body.

The vehicle lamp may include an outer cover 6 which covers the LED light sources 11 and the light guiding lens 13. The outer cover may include: a light transmission portion 14 that transmits light emitted from the light guiding lens 14; and a light cut-off portion 16 that cuts off light directly emitted from the LED light sources 11.

The vehicle lamp may include an outer cover 6 which covers the LED light sources 11 and the light guiding lens 13. A positioning structure 45, 46, 47 for positioning the outer cover 6 with respect to a housing 3 of a door mirror may be provided on the outer cover 6.

According to the vehicle lamp of the embodiments, since light from the LED light sources is reflected on the reflecting sections on the light guiding lens, light emitting directions can be determined depending upon orientations of the reflecting sections. Thus, the plurality of LED light sources can be arranged on a single substrate, whereby the number of components can be reduced, thereby making it possible to fabricate the lamp inexpensively. In addition, since the orientations of the reflecting sections can easily be changed, an optimum light distribution pattern can be formed on the periphery of the vehicle in accordance with the shape of a vehicle and positions of LED light sources.

[Description of Reference Numerals and Signs]

| | |
|---|---|
| 1 | Side turn signal lamp |
| 2 | Lamp body |
| 3 | Mirror housing |
| 6 | Outer cover |
| 11 | LED light source |
| 12 | Substrate |
| 13 | Light guiding lens |
| 14 | Light transmission portion |
| 16 | Light cutting off portion |
| 18 | Incident portion |
| 19, 20 | Mounting piece |
| 22 | Reflecting section |
| 23 | Light emitting surface |
| 26 | Hook pin |
| 28, 32 | Hook claw |
| 45, 46, 47 | Positioning structure |

What is claimed is:

1. A vehicle lamp comprising:

a common substrate;

a plurality of LED light sources arranged on the common substrate;

a light guiding lens elongated in a direction in which the LED light sources are aligned, the plurality of the LED light sources arranged above the light guiding lens; and a plurality of reflecting sections disposed on lower of the light guiding lens and configured to individually reflect incident lights from the respective LED light sources to a periphery of a vehicle, wherein respective directions of the reflecting sections are made to differ in accordance with positions of the corresponding LED light sources.

2. The vehicle lamp according to claim 1, wherein each of the LED light sources has an optical axis extending in a substantially vertical direction.

3. The vehicle lamp according to claim 1, wherein the light guiding lens includes:

a mounting portion by which the light guiding lens is attached to a housing of a door mirror; and a hook portion by which the substrate is attached to the light guiding lens.

4. The vehicle lamp according to claim 1, wherein the plurality of reflecting sections are formed so as to direct further rearwards of the vehicle as the plurality of reflecting sections are spaced apart from a vehicle body.

5. A vehicle lamp comprising:

a common substrate;

a plurality of LED light sources arranged on the common substrate;

light guiding lens elongated in a direction in which the LED light sources are aligned;

a plurality of reflecting sections provided on the light guiding lens and configured to individually reflect incident lights from the respective LED light sources to a periphery of a vehicle, wherein respective directions of the reflecting sections are made to differ in accordance with positions of the corresponding LED light sources; and an outer cover which covers the LED light sources and the light guiding lens, wherein the outer cover includes:

a light transmission portion that transmits light emitted from the light guiding lens; and a light cut-off portion that cuts off light directly emitted from the LED light sources.

6. The vehicle lamp according to claim 1, further comprising an outer cover which covers the LED light sources and the light guiding lens, wherein a positioning structure for positioning the outer cover with respect to a housing of a door mirror is provided on the outer cover.

7. The vehicle lamp according to claim 1, wherein each of the reflecting sections reflects incident light from a substantially vertical direction to a substantially horizontal direction.

8. The vehicle lamp according to claim 1, wherein a number of the reflecting sections is equal to a number of the LED light sources.

9. The vehicle lamp according to claim 1, wherein each of the reflecting sections totally reflects incident light from a corresponding one of the LED light sources in a substantially horizontal direction.

10. The vehicle lamp according to claim 1, wherein the light guiding lens comprises incident portions comprising convex lenses on which light from the LED light source is incident individually.

11. The vehicle lamp according to claim 10, wherein a number of the incident portions is equal to a number of the LED light sources.

12. A vehicle lamp comprising:

a common substrate;

a plurality of LED light sources arranged on the common substrate;

a light guiding lens elongated in a direction in which the LED light sources are aligned; and a plurality of reflecting sections provided on the light guiding lens and configured to individually reflect incident lights from the respective LED light sources to a periphery of a vehicle, wherein respective directions of the reflecting sections are made to differ in accordance with positions of the corresponding LED light sources, wherein each of the reflecting sections reflects incident light from a substantially vertical direction to a substantially horizontal direction.

* * * * *